(12) United States Patent
Cheng

(10) Patent No.: US 11,577,295 B2
(45) Date of Patent: Feb. 14, 2023

(54) SYSTEM AND METHOD FOR CONNECTING METAL WORKPIECES

(71) Applicant: Paul Po Cheng, London (CA)

(72) Inventor: Paul Po Cheng, London (CA)

( * ) Notice: Subject to any disclaimer, the term of this patent is extended or adjusted under 35 U.S.C. 154(b) by 410 days.

(21) Appl. No.: 16/839,114

(22) Filed: Apr. 3, 2020

(65) Prior Publication Data

US 2020/0316666 A1 Oct. 8, 2020

Related U.S. Application Data

(60) Provisional application No. 62/828,589, filed on Apr. 3, 2019.

(51) Int. Cl.
| | | |
|---|---|---|
| *B23K 20/12* | (2006.01) | |
| *B21D 9/08* | (2006.01) | |
| *B23K 13/01* | (2006.01) | |
| *B23K 13/02* | (2006.01) | |

(52) U.S. Cl.
CPC ............ *B21D 9/08* (2013.01); *B23K 13/015* (2013.01); *B23K 13/025* (2013.01); *B23K 20/12* (2013.01)

(58) Field of Classification Search
CPC ...... B21D 9/08; B23K 13/015; B23K 13/025; B23K 20/12–1215; B23K 2101/06; B23K 2101/10; B23K 20/1205; B23K 20/14; B23K 20/24; B21K 25/005; B21J 5/063
USPC ................. 228/112.1–115, 2.1–3.1
See application file for complete search history.

(56) References Cited

U.S. PATENT DOCUMENTS

| | | | | |
|---|---|---|---|---|
| 3,121,948 A | * | 2/1964 | Michael | B23K 35/002 228/262.44 |
| 4,012,616 A | * | 3/1977 | Zelahy | B23K 13/04 219/603 |
| 5,240,167 A | * | 8/1993 | Ferte | B23K 20/129 228/114.5 |
| 5,271,287 A | * | 12/1993 | Wadleigh | B23K 20/12 74/439 |
| 5,699,955 A | * | 12/1997 | Shimizu | B23K 20/16 228/262.71 |
| 5,831,252 A | * | 11/1998 | Shimizu | B23K 20/008 228/111.5 |
| 6,007,923 A | * | 12/1999 | Shimizu | C22C 14/00 420/419 |
| 6,105,849 A | * | 8/2000 | Mochizuki | B23K 20/12 228/114.5 |
| 6,637,642 B1 | * | 10/2003 | Lingnau | B23K 20/12 219/601 |

(Continued)

*Primary Examiner* — Kiley S Stoner

(57) ABSTRACT

A method of forming an assembly in which a metal extension element is connected with a metal stub element, by an intermediate element. The intermediate element extends between first and second ends. The intermediate element is positioned to locate its first end spaced apart from the stub element. An inner end of the extension element is spaced apart from the second end of the intermediate element. Heating elements are located between the elements, to heat the proximal portions of the elements to a hot working temperature, at which the heated portions are subject to plastic deformation. The heating elements are removed, and while the intermediate element is rotating, the first end is urged against the stub element to bond the intermediate element with the stub element. While the extension element is rotating, the inner end is urged against the second end to bond the extension element and the intermediate element.

5 Claims, 17 Drawing Sheets

(56) References Cited

U.S. PATENT DOCUMENTS

| | | | |
|---|---|---|---|
| 7,348,523 B2 | 3/2008 | Slack et al. | |
| 7,931,184 B2 * | 4/2011 | Lingnau | B23K 20/12 |
| | | | 228/2.1 |
| 8,950,651 B2 * | 2/2015 | Oiwa | F01D 5/3061 |
| | | | 228/112.1 |
| 8,998,067 B2 * | 4/2015 | Lehr | B23K 20/129 |
| | | | 228/2.1 |
| 9,644,769 B1 * | 5/2017 | Cheng | B23K 20/12 |
| 10,288,193 B2 | 5/2019 | Cheng | |
| 2022/0063019 A1 * | 3/2022 | Stefano | B23K 26/211 |

* cited by examiner

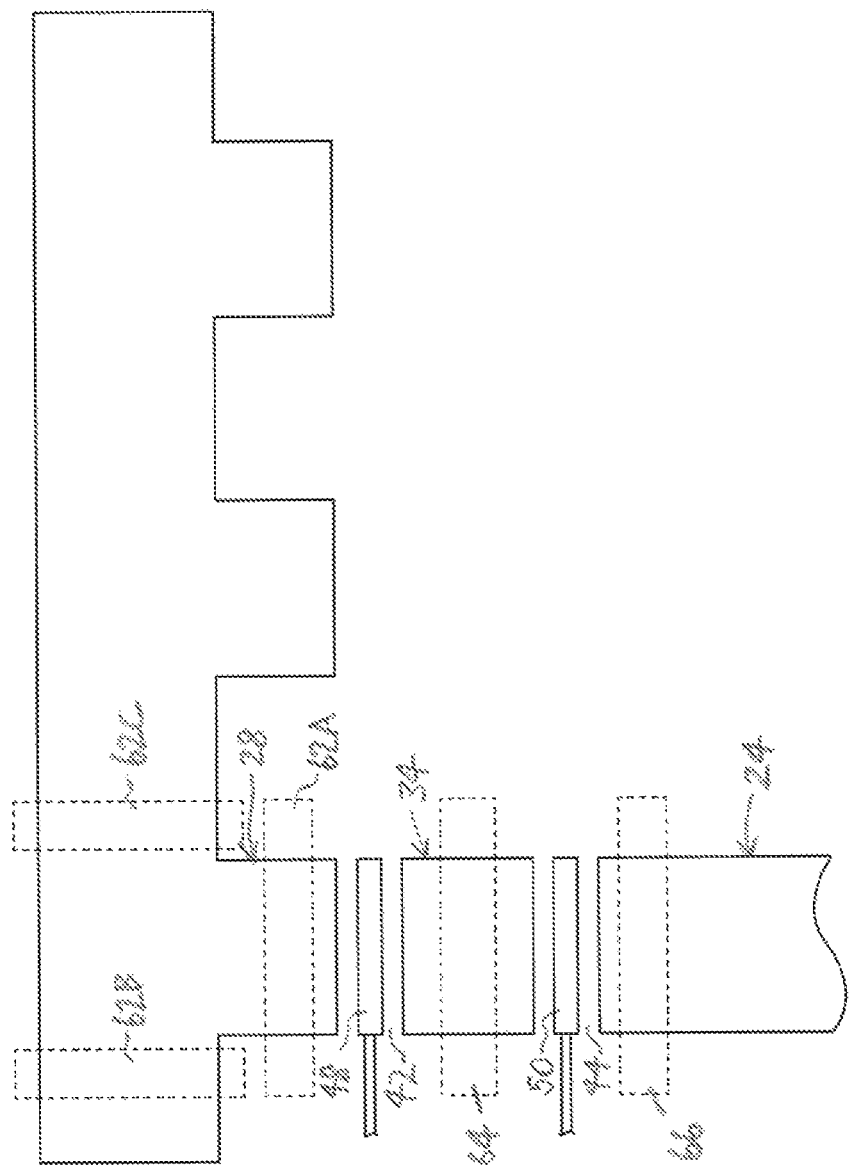

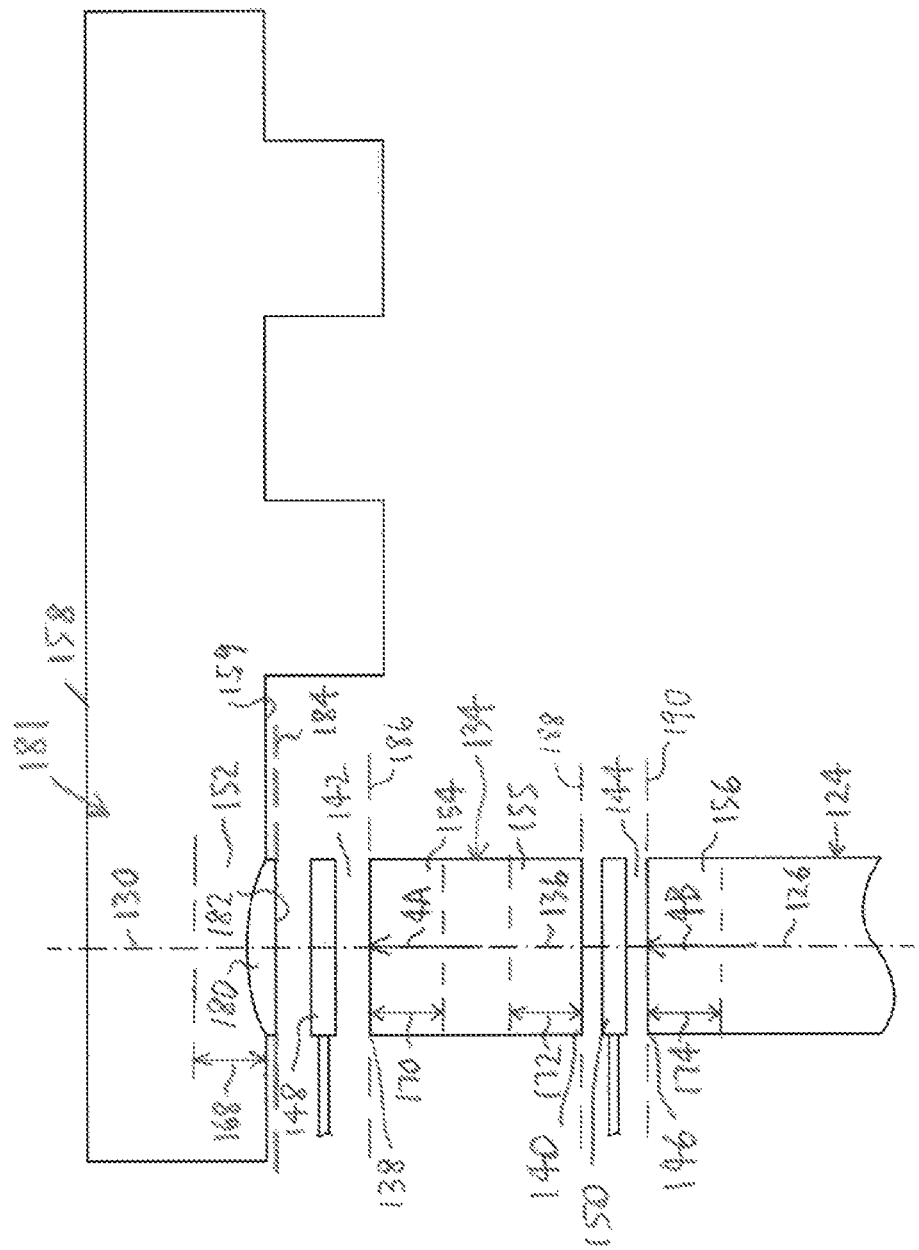

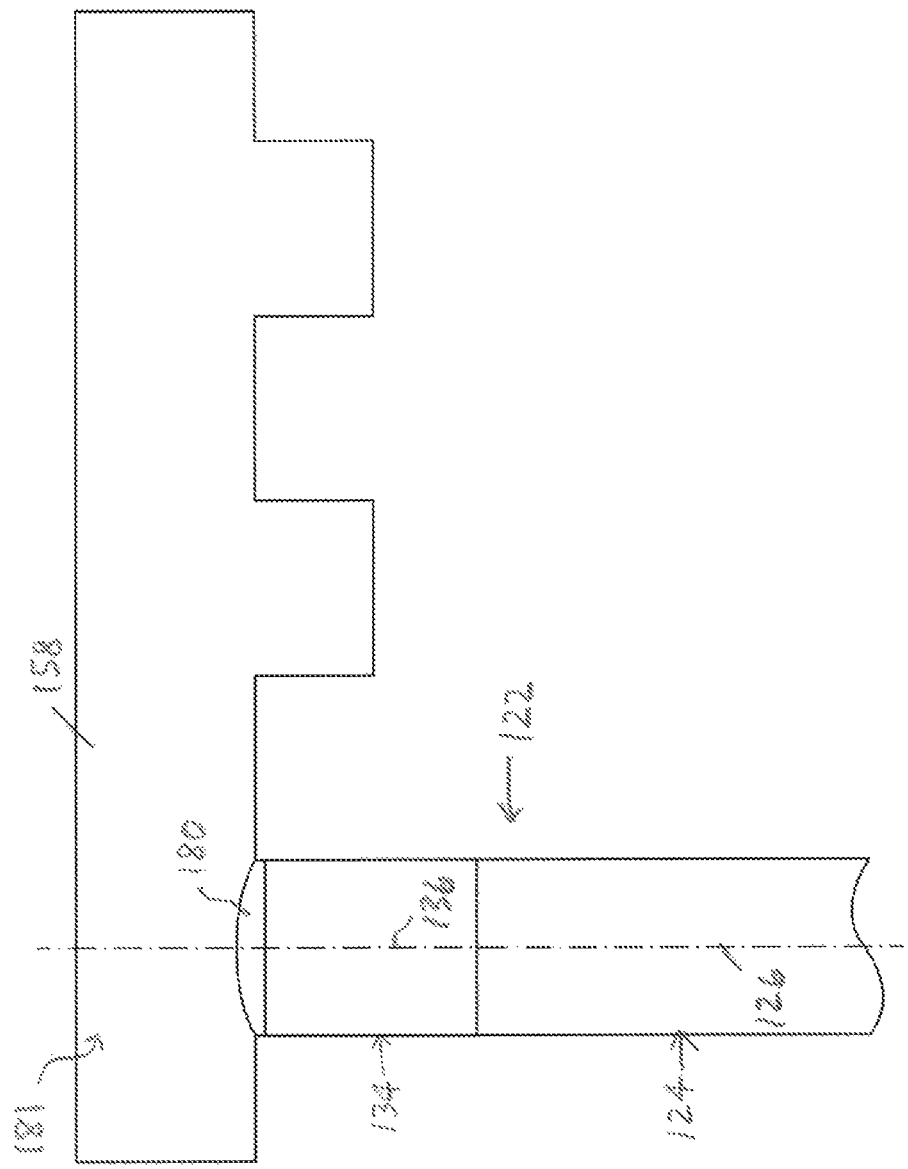

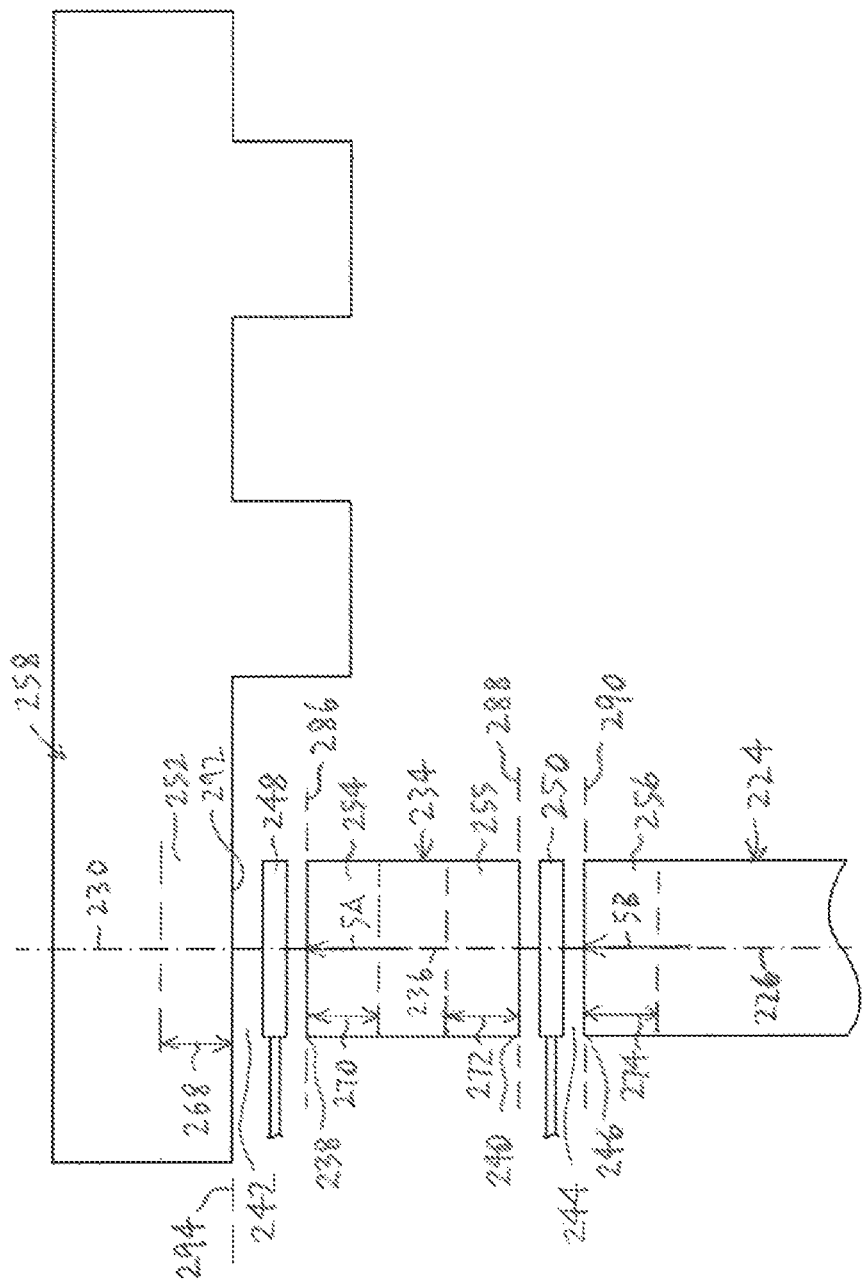

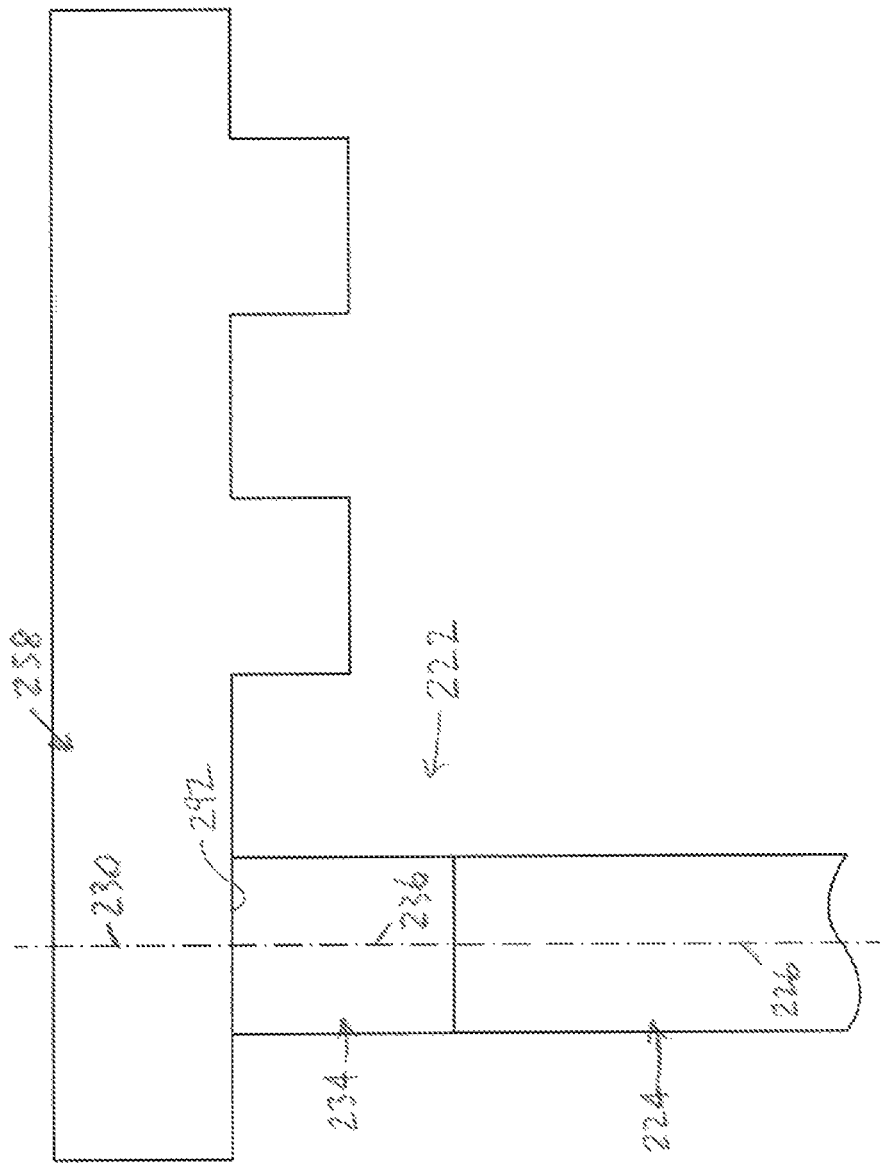

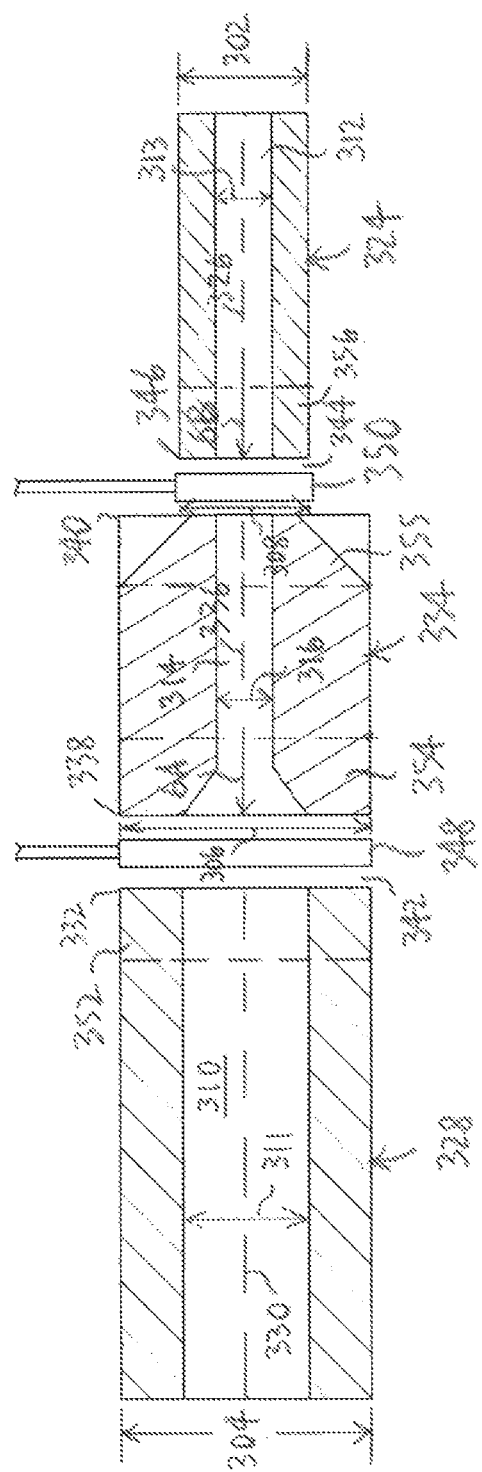

SYSTEM AND METHOD FOR CONNECTING METAL WORKPIECES

This application claims priority from U.S. Provisional Patent Application No. 62/858,589, filed on Apr. 3, 2019, the entire disclosure whereof is hereby incorporated by reference herein.

FIELD OF THE INVENTION

The present invention is a method and a system for forming an assembly in which an extension element is connected with another element by an intermediate element.

BACKGROUND OF THE INVENTION

As is known in the art, metal elements having opposed substantially planar and parallel surfaces may be welded together by a process described as solid state welding. For instance, a method of solid state welding is disclosed by U.S. Pat. No. 6,637,642 (Lingnau).

The known methods have certain disadvantages. For instance, the known methods of solid state welding are generally not usable where one of the workpieces is stationary. Also, the known methods typically are not suitable where it is sought to connect two workpieces made of two different metals (e.g., different alloys) that are not directly bondable with each other.

SUMMARY OF THE INVENTION

For the foregoing reasons, there is a need for a system and method for forming an assembly in which a metal extension element is connected with another metal element by an intermediate element that overcomes or mitigates one or more of the defects or disadvantages of the prior art. Such defects or disadvantages are not necessarily included in those described above.

In its broad aspect, the method includes providing an intermediate element that is metallically bondable with each of the extension element and the other metal element, e.g., a stub element. The extension element is partially defined by an extension element axis thereof. The stub element is partially defined by a stub element axis thereof, and the stub element has an exposed end.

The intermediate element is partially defined by an intermediate element axis, and the intermediate element extends between first and second ends thereof. The intermediate element is positioned relative to the stub element to define a first gap between the first end and the exposed end, and also to align the intermediate element axis with the stub element axis.

The extension element is positioned relative to the intermediate element to define a second gap between an inner end of the extension element and the second end of the intermediate element. The extension element is also positioned to align the extension element axis with the intermediate element axis.

First and second heating elements are provided, which are located in the first and second gaps respectively. Non-oxidizing atmospheres are also provided, and defined at the exposed end and the first end, and also at the second end and the inner end, so that the heating elements may heat each of the exposed end, the first end, the second end, and the inner end in non-oxidizing atmospheres.

The heating elements are energized, to provide hot portions at each of the exposed end, the first end, the second end, and the inner end. Once the hot portions at each of exposed end, the first end, the second end, and the inner end are heated to a hot working temperature at which each of the exposed end, the first end, the second end, and the inner end are all respectively subject to plastic deformation, the heating elements are withdrawn from the first and second gaps.

While the intermediate element rotates about the intermediate element axis, the first end of the intermediate element is urged against the exposed end, for plastic deformation of the first end and the exposed end, to bond the intermediate element and the stub element with each other. Subsequently, while the extension element rotates about the extension element axis, the inner end is urged against the second end, for plastic deformation of the inner end and the second end, to bond the extension element and the intermediate element with each other.

BRIEF DESCRIPTION OF THE DRAWINGS

The invention will be better understood with reference to the attached drawings, in which:

FIG. 1A is a top view of an embodiment of an intermediate element of the invention positioned between a stub element and an extension element to define respective first and second gaps therebetween, in which first and second heating elements are respectively receivable;

FIG. 7A is a top view of an embodiment of an intermediate element of the invention positioned between a tubular body with a ring element thereon to form a tubular body subassembly and an extension element to define respective first and second gaps therebetween, in which first and second heating elements are respectively receivable, drawn at a smaller scale;

FIG. 7C is a top view of an alternative embodiment of the assembly of the invention in which the tubular body subassembly is connected with the extension element by the intermediate element, drawn at a smaller scale;

FIG. 8A is a top view of an embodiment of an intermediate element of the invention positioned between a body with a flat surface with an aperture therein, and an aperture perimeter region around the aperture, and an extension element, to define respective first and second gaps therebetween, in which first and second heating elements are respectively receivable;

FIG. 8C is a top view of an alternative embodiment of the assembly of the invention in which the body is connected with the extension element by the intermediate element;

FIG. 9A is a longitudinal cross-section of an alternative embodiment of the intermediate tube of the invention positioned between a first tube having a first tube outer diameter, and an extension tube having an extension tube outer diameter;

DETAILED DESCRIPTION

Figure 1B:
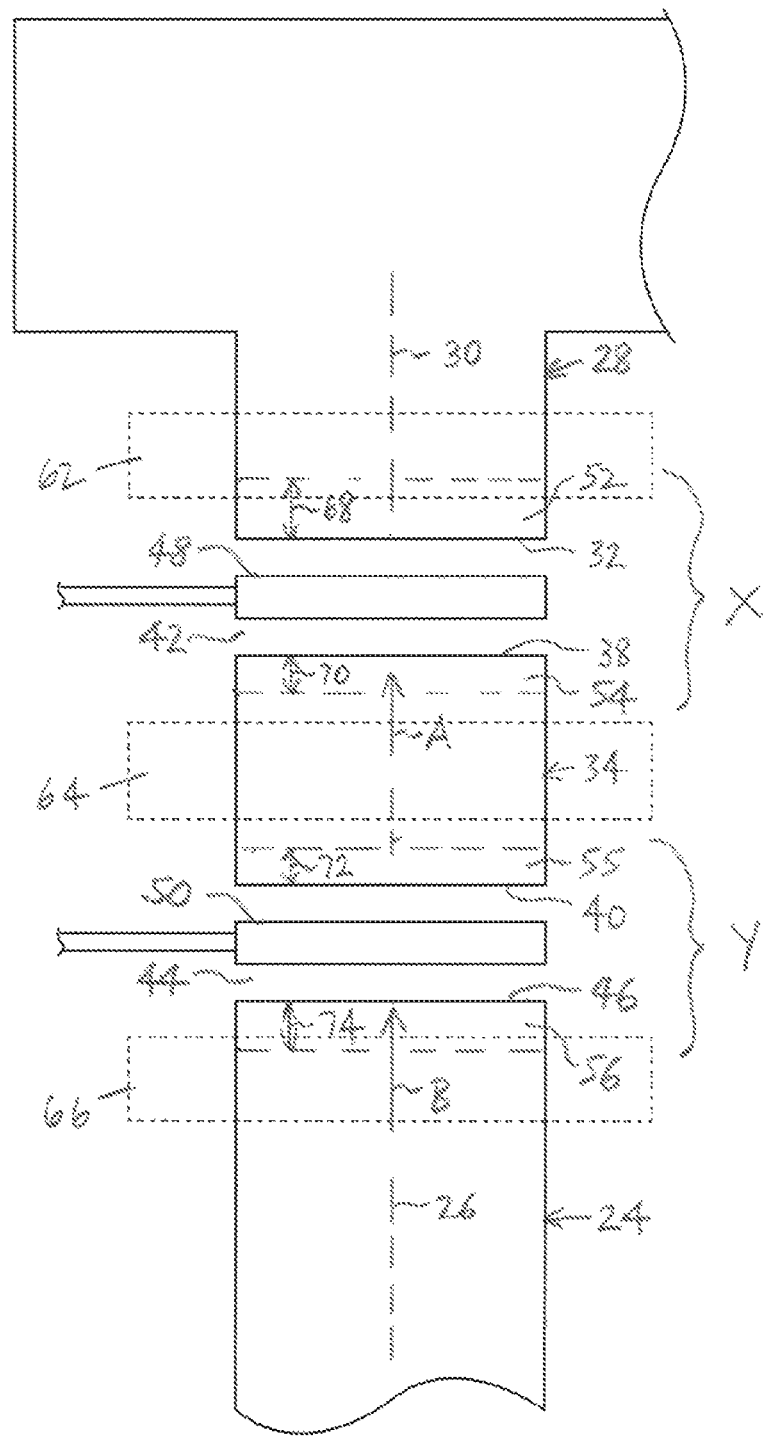
FIG. 1B is a portion of the top view of FIG. 1A, drawn at a larger scale.
Figure 2:
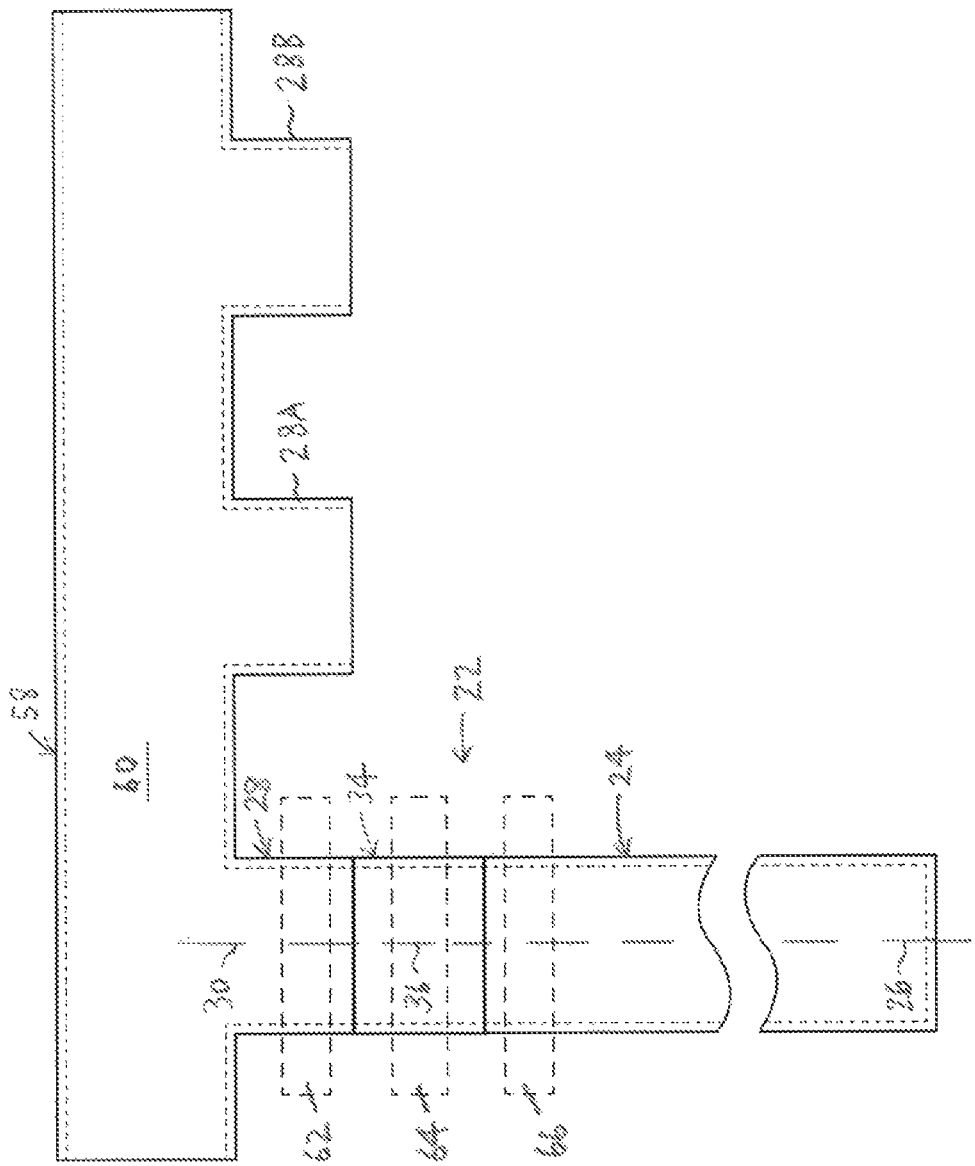
FIG. 2 is a top view of an embodiment of an assembly of the invention in which the stub element is connected with the extension element by the intermediate element, drawn at a smaller scale.

In the attached drawings, like reference numerals designate corresponding elements throughout. Reference is first made to FIGS. 1A-2 to describe an embodiment of the method of the invention. In one embodiment, the method is for forming an assembly 22 (FIG. 2) in which a metal extension element 24 partially defined by an extension element axis 26 thereof is connected with a metal stub element 28 that is partially defined by a stub element axis 30 thereof. As can be seen in FIGS. 1A and 1B, initially, the stub element 28 has a stub element exposed end 32.

In one embodiment, the method of the invention includes providing an intermediate element 34 metallically bondable with each of the stub element 28 and the extension element 24 respectively (FIG. 2). Preferably, the intermediate element 34 is partially defined by an intermediate element axis 36. The intermediate element 34 preferably extends between first and second ends 38, 40 thereof (FIG. 1B).

As illustrated in FIGS. 1A and 1B, the intermediate element 34 is positioned relative to the stub element 28 to define a first gap 42 between the first end 38 of the intermediate element 34 and the stub element exposed end 32, and to align the intermediate element axis 36 with the stub element axis 30. Also, the extension element 24 preferably is positioned relative to the intermediate element 34 to define a second gap 44 between an inner end 46 of the extension element 24 and the second end 40 of the intermediate element 34, and to align the extension element axis 26 with the intermediate element axis 36.

Preferably, one or more first heating elements 48 and one or more second heating elements 50 are provided (FIGS. 1A, 1B). The heating elements may be any suitable elements, e.g., induction coils may be used. It is also preferred that the first and second heating elements 48, 50 are located in the first and second gaps 42, 44 respectively. One or more non-oxidizing atmospheres are provided in defined volumes around each of the first gap and the second gap respectively, as will be described.

Preferably, the first heating element 48 is energized, to heat the stub element exposed end 32 and the first end 38 of the intermediate element to a hot working temperature in the non-oxidizing atmosphere. At approximately the same time, the second heating element 50 is energized, to heat the second end 40 of the intermediate element 34 and the extension element inner end 46 to the hot working temperature in the non-oxidizing atmosphere. Energizing the first heating element 48 provides a first hot portion 52 of the stub element 28, and a second hot portion 54 of the intermediate element 34, at the first end 38 of the intermediate element 34 (FIG. 1B). Energizing the second heating element 50 provides a third hot portion 55 at the second end 40 of the intermediate element 34, and a fourth hot portion 56 at the inner end 46 of the extension element 24. It will be understood that each of the hot portions 52, 54, 55, 56 is at the hot working temperature, after heating thereof by the heating elements.

Preferably, once the hot portions are heated to the hot working temperature, the first and second heating elements 48, 50 are removed from the first and second gaps 42, 44 respectively. It will be understood that the first and second heating elements 48, 50 are configured for this, i.e., they are adapted to be located in the gaps 42, 44 when the intermediate element 34 and the extension element 24 are aligned, and they also are adapted for removal from the gaps 42, 44 when the hot portions 52, 54, 55, 56 are heated to the hot working temperature.

It will be understood that the first and second hot portions 52, 54, and the third and fourth hot portions 55, 56 preferably are heated to the hot working temperature at approximately the same time. As will be described, once the first and second hot portions 52, 54 are engaged, it is desirable that the third and fourth hot portions 55, 56 are also engaged, shortly after the first and second hot portions 52, 54 have been engaged.

The intermediate element 34 preferably is rotated about the intermediate element axis 36. Next, while the respective hot portions 54, 52 of the intermediate element 34 and the stub element 28 are at the hot working temperature, and also while the intermediate element 34 continues to rotate about the intermediate element axis 36, the first end 38 of the intermediate element 34 is urged against the stub element exposed end 32, for plastic deformation of the intermediate element 34 at the first end 38, and also for plastic deformation of the stub element 28 at the stub element exposed end 32, to bond the intermediate element 34 and the stub element 28 with each other. The direction in which the intermediate element 34 is translocated (or moved) and urged against the stub element 28 is indicated by arrow "A" in FIG. 1B.

Next, the extension element 24 preferably is rotated about the extension element axis 26. While the respective hot portions 55, 56 of the intermediate element 34 and the extension element 24 are at the hot working temperature, and while the extension element 24 continues to rotate about its axis 26, the extension element inner end 46 preferably is urged against the second end 40 of the intermediate element 34, for plastic deformation of the intermediate element 34 at its second end 40, and for plastic deformation of the extension element 24 at its inner end 46, to bond the intermediate element 34 and the extension element 24 with each other. The direction in which the extension element 24 is translocated (or moved) and urged against the intermediate element is indicated by arrow "B" in FIG. 1B.

It will be understood that the stub element 28, the intermediate element 34, and the extension element 24 may be hollow (i.e., they may be tubes), or they may alternatively be solid, i.e., not hollow. As an example, and as illustrated in FIG. 2, the stub element 28 may be only one of a number of tube stub elements included in a manifold or header 58 with a cavity 60 therein. In this situation, the elements 28, 34, and 24 are tubes, permitting communication or flow therethrough, to and/or from the cavity 60 (FIG. 2). It will also be understood that, whether the elements 28, 34, and 24 are tubes or solid, the procedure to be used to connect the elements is the same, although the details may vary, depending on whether the elements are tubes or solid elements, as will be described.

The additional tube stub elements that are illustrated in FIGS. 1A and 2 are identified by reference characters 28A and 28B for clarity of illustration. It will also be understood that other extension elements and intermediate elements that may be connected with the additional stub elements 28A, 28B are omitted from the drawings for clarity of illustration.

Those skilled in the art would appreciate that, in addition to the heating elements 48, 50 described above and illustrated, a number of additional devices may be needed to practise the method of the invention. In one embodiment, the system 20 preferably includes suitable clamps or similar devices 62 for securing the stub element 28 in a stationary position when the intermediate element 34 is urged against the stub element 28 (FIG. 1B). It will be understood that the clamp 62 may be positioned in any suitable location or locations.

In FIG. 1A, three different clamps 62A, 62B, and 62C are illustrated. Depending on the circumstances, not all of the three clamps 62A, 62B, 62C illustrated in FIG. 1A may be required.

Similarly, it will be understood that both rotational and translocational movement of the intermediate element 34 and of the extension element 24 is effected via clamps or similar devices 64, 66 respectively. It will also be understood that the means for rotating and translocating the clamps 64, 66 (i.e., to cause rotation and translocation of the intermediate element 34 and of the extension element 24 respectively) are omitted from the drawings, for clarity of illustration.

As can be seen in FIG. 1B, once the heating elements 48, 50 are removed from the first and second gaps 42, 44 respectively, the first end 38 of the intermediate element 34 is urged against the stub element exposed end 32, i.e., the intermediate element 34 is subjected to translocational movement in the direction indicated by arrow "A" in FIG. 1B, and simultaneously urged in that direction against the stub element 28 with substantial force once the first end 38 engages the stub element exposed end 32. As described above, when the first end 38 is first urged against the stub element exposed end 32, the intermediate element 34 is rotating about the intermediate element axis 36. Those skilled in the art would appreciate that although the first end 38 is urged against the stub element exposed end 32 with significant force, the rotation of the intermediate element 34 continues for only a short time after the first end 38 first engages the stub element exposed end 32. When the intermediate element 34 and the stub element 28 are bonded with each other, rotation of the intermediate element 34 ceases. That is, once the intermediate element 34 cannot be further rotated, the intermediate element 34 and the stub element 28 are metallically bonded with each other. It will be understood that the intermediate element 34 may continue to be urged in the direction indicated by arrow "A" for a short time after the rotation of the intermediate element 34 has ceased.

The first end 38 of the intermediate element 36 is rotating when the first end 38 initially engages the stub element exposed end 32 in order to cause plastic deformation of the first end 38 and the stub element exposed end 32, resulting in the intermediate element 36 and the stub element 28 metallically bonding with each other, as will be described.

As can also be seen in FIG. 1B, once the heating elements 48, 50 are removed from the first and second gaps 42, 44, the extension element inner end 46 is urged against the second end 40 of the intermediate element 34. The direction of the translocational movement of the extension element 24 is indicated by arrow "B" in FIG. 1B. It will be understood that, ideally, the translocational movement of the extension element 24 takes place shortly after the intermediate element 34 has bonded with the stub element 28, as described above. Once the extension element inner end 46 engages the second end 40, the extension element 24 is simultaneously urged in the direction indicated by arrow "B" in FIG. 1B, with substantial force. When the inner end 46 first engages the second end 40 of the intermediate element 34, the extension element 24 is rotating about its axis 26. The extension element inner end 46 is urged against the second end 40 of the intermediate element 34 with significant force, however, the rotation of the extension element 24 continues for only a short time after the inner end 46 first engages the second end 40. When the extension element 24 and the intermediate element 34 are bonded with each other, rotation of the extension element 24 ceases. That is, once the extension element 24 cannot be further rotated, the extension element 24 and the intermediate element 34 are metallically bonded with each other. It will be understood that the extension element 24 may continue to be urged in the direction indicated by arrow "B" for a short time period after rotation of the extension element 24 has ceased.

The extension element inner end 46 of the extension element 24 is rotating when the extension element inner end 46 engages the second end 40 of the intermediate element 34 in order to cause plastic deformation of the extension element inner end 46 and the second end 40, resulting in the extension element 24 and the intermediate element 34 metallically bonding with each other.

It will be understood that the hot working temperature is a temperature (or a small range of temperatures) at which the metal of the element (i.e., the stub element 28, the intermediate element 34, and the extension element 24) is subject to plastic deformation. It will be understood that, for the purposes hereof, "metal" may include alloys. The non-oxidizing atmosphere may be, e.g., a suitable non-oxidizing atmosphere contained in a small, isolated volume surrounding the hot portions 52, 54, 55, 56 when the hot portions are heated by the first and second heating elements 48, 50.

The non-oxidizing atmosphere may be, e.g., a small, isolated volume surrounding the hot portions 52, 54, 55, 56 that is occupied by a generally inert gas such as nitrogen, or at least substantially occupied by a generally inert gas. The non-oxidizing atmosphere may be isolated from the ambient atmosphere using any suitable device or structure. Those skilled in the art would be familiar with suitable non-oxidizing atmospheres and techniques related to same.

The regions in which the non-oxidizing atmospheres preferably are located are identified generally as "X" and "Y" in FIG. 1B, for convenience. It will be understood that the "X" region of a first non-oxidizing atmosphere preferably encompasses the hot portions 52, 54, and the "Y" region of a second non-oxidizing atmosphere preferably encompasses the hot portions 55, 56. Those skilled in the art would appreciate that the "X" and "Y" regions may be isolated and defined by any suitable devices or structures (not shown), and that any such devices or structures preferably are adapted for relatively fast deployment (i.e., once the intermediate element 34 and the extension element 24 are aligned), and also for relatively fast removal (i.e., once the hot portions 52, 54, 55, 56 have been heated to the hot working temperature).

As can be seen in FIG. 1B, the stub element hot portion 52 preferably extends a first predetermined distance 68 from the stub element exposed end 32 into the stub element 28. The first intermediate element hot portion 54 extends a first predetermined intermediate element distance 70 from the first end 38 into the intermediate element 34. It is also preferred that the second intermediate element hot portion 55 extends a second predetermined intermediate element distance 72 from the second end 40 into the intermediate element 34. The extension element hot portion 56 extends a second predetermined distance 74 from the extension element inner end 46 into the extension element 24.

From the foregoing, it will be understood that the each of the heating elements 48, 50 heats a layer (i.e., a hot portion) of each workpiece (i.e., the stub element 28, the intermediate element 34, and the extension element 24), from an exposed end of the element inwardly therein, sufficiently to make the material soft enough that it can be plastically deformed when the exposed ends are brought together. The relatively "soft" heated layers at the exposed ends of the elements are pushed together axially (i.e., at least one of the elements is translocated to engage the other), and simultaneously, one of the elements is rotated about its axis, thereby subjecting the material in the hot portions to shear stresses. It will be understood that the elements are urged against each other with significant force, and at the same time, rotation of one of the elements continues for a short time after engagement. Because they are at the hot working temperature, the contact surfaces of the exposed ends of the elements tend to adhere to each other, when the exposed ends are engaged.

The shearing action results from the contact surfaces at the two exposed ends adhering to each other while one of the elements rotates.

It is believed that this shearing action, in the non-oxidizing atmosphere (e.g., a nitrogen atmosphere), amends the microstructure of the metal in the hot portions. It will be understood that, shortly after the rotating element engages the other element, the rotation of the rotating element stops, and the metal in each of the two engaged hot portions is allowed to cool.

It is understood that recrystallization of the material in the hot portions (or in parts thereof) takes place after engagement of the hot portions and their subjection to shear stresses, outlined above. At this point, the manner in which the recrystallization takes place is not well understood. It is believed that the recrystallization may be dynamic, or may generally take place as the metal cools. It appears that the engagement of the heated metal from the engaged elements and its recrystallization results in a relatively uniformly fine-grained region that is integrally formed with both of the engaged elements, so that they are metallically bonded together.

For example, after the first end 38 of the intermediate element 34 (which is engaged with the stub element exposed end 32) stops rotating, the metal in the respective hot portions of the intermediate element 34 and stub element 28 the cools, and the intermediate element 34 and the stub element 28 are bonded together at their respective ends 38, 32. In the same way, after the second end of the intermediate element 34 (which is engaged with the extension element inner end 46) stops rotating, the metal in the respective hot portions of the intermediate element 34 and the extension element 24 cools, and the intermediate element 34 and the extension element 24 are bonded together at their respective ends 40, 46.

Those skilled in the art would appreciate that the bond that is so formed has a number of advantages over the bonds formed using other welding methods. For instance, the bonds formed using this method have good axial, radial, and circumferential uniformity. The welds provided are substantially free of notches or other irregularities, with smooth profiles on both inner and outer diameters. Post-weld stress relief and post-weld machining are eliminated. Stress risers (e.g., centerline grooves, or toe grooves) are also eliminated. Also, no filler material is needed.

Those skilled in the art would appreciate that where the tubes have larger diameters and/or thicker walls, multiple segmented heating elements (e.g., induction coils) may be used, in order to provide sufficient heat. For the purposes hereof, a reference to "the" heating element will be understood to refer to one and/or more than one heating element, depending on whether a multiple segmented heating element or some other arrangement involving a number of heating elements is used.

Because of the need to have the hot portions 52, 54, 55, 56 at the hot working temperature, it is important that the intermediate element 34 be axially engaged with the two other elements (i.e., the stub element 28, and the extension element 24) relatively promptly after the first and second heating elements 48, 50 are removed from the first and second gaps 42, 44. Also, it is preferred that the first end 38 of the intermediate element 34 be engaged with the stub element exposed end 32 shortly before the extension element inner end 46 engages the second end 40 of the intermediate element 34.

From the foregoing, it can be seen that the system and the method of the invention may be used where the elements to be joined together are relatively small.

Those skilled in the art would appreciate that the method and the system of the invention may be used to connect two elements that are not compatible to be conventionally welded with each other. For example, the stub element 28 may be made of a first metal, and the extension element 24 may be made of a second metal, which is not suitable for welding directly to the first metal. In these circumstances, it is preferred that the intermediate element 34 is made of a third metal that is metallically bondable with each of the first metal and the second metal. In this way, the stub element may be connected with the extension element, to form the assembly 22, even if the stub element and the extension element thereof are not suitable for conventional welding with each other.

It will be understood that the method of the invention may be used in various configurations. For example, in FIGS. 3 and 4, a stub element 28' forming part of a network subassembly of tubes or pipes (not necessarily oriented horizontally) 58' is connected, via an intermediate element 34', with an extension element 24'. The network subassembly 58' may be stationary.

Figure 3:
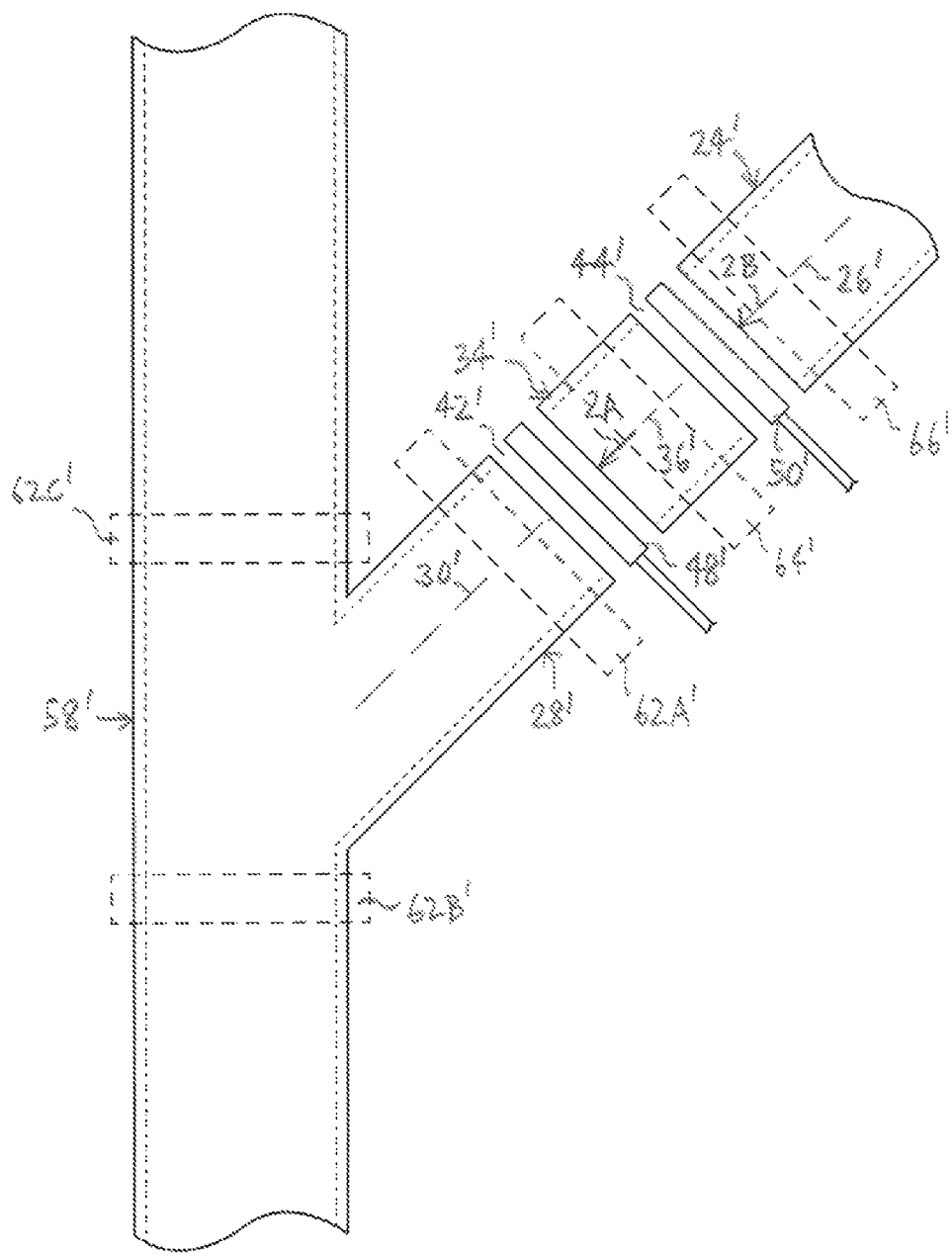
FIG. 3 is a top view of the intermediate element positioned between the stub element and the extension element to define respective first and second gaps therebetween in which first and second heating elements are respectively receivable, drawn at a larger scale.
Figure 4:
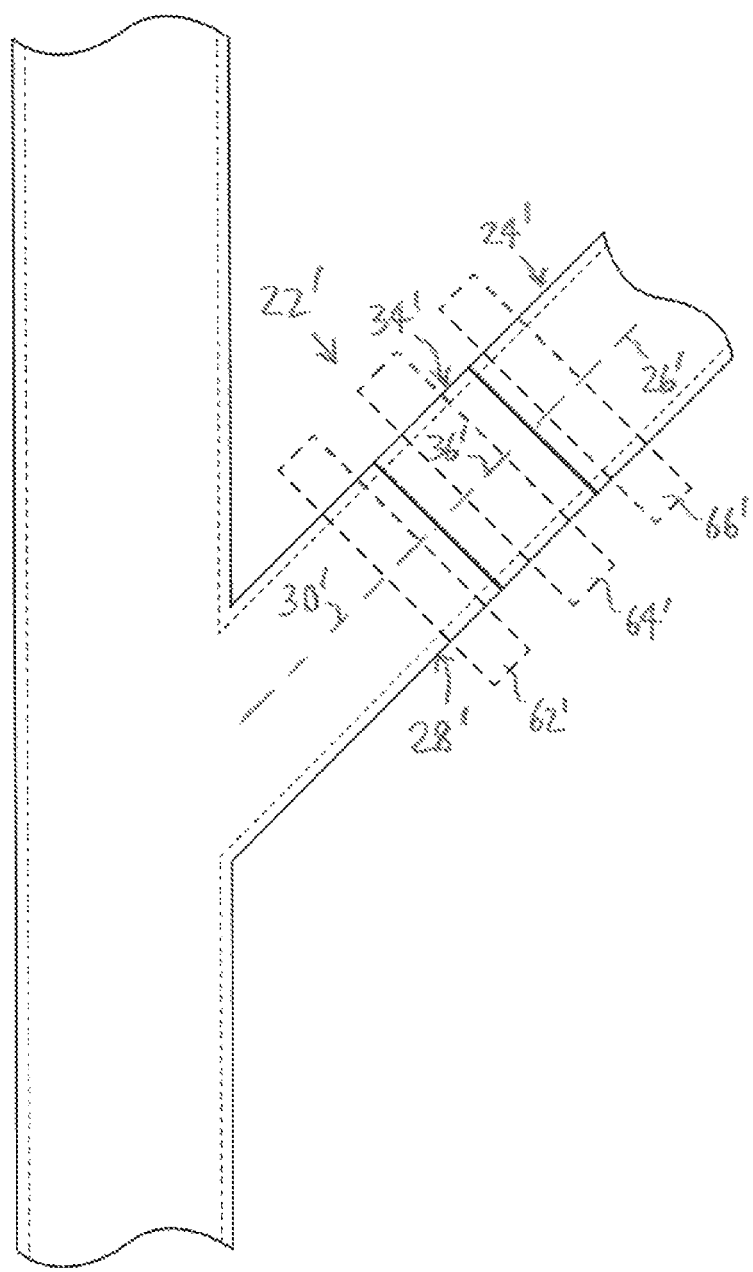
FIG. 4 is a top view of an alternative embodiment of the assembly of the invention in which the stub element is connected with the extension element by the intermediate element.

As can be seen in FIGS. 3 and 4, clamps 62', 64', and 66' preferably are secured to the stub element 28', the intermediate element 34' and the extension element 24' respectively. In FIG. 3, for illustrative purposes, clamps identified as 62A', 62B', and 62C' are shown, to show different locations for one or more clamps used to secure the stub element 28'. It will be understood that not all of the clamps 62A', 62B', and 62C' may be required to be used at one time.

In FIG. 3, the intermediate element 34' is positioned to define a first gap 42' between it and the stub element 28', and the extension element 24' is positioned to define a second gap 44' between it and the intermediate element 34'. The intermediate element axis 36' is aligned with the stub element axis 30', and the extension element axis 26' is aligned with the intermediate element axis 36'. The first heating element 48' and the second heating element 50' preferably are located in the first and second gaps 42', 44' respectively.

It will be understood that, in the same way as described above in connection with FIGS. 1A-2, hot portions (not shown) of each of the stub element 28', the intermediate element 34', and the extension element 24' preferably are heated to the hot working temperature in a non-oxidizing atmosphere by the heating elements 48', 50'. The heating elements 48', 50', are then removed from the gaps 42', 44', and while the intermediate element 34' rotates about its axis 36', the intermediate element 34' is translocated to engage the stub element 28', and while rotating, is urged against the stub element 28'. The intermediate element 34' is moved, and subsequently urged, in the direction indicated by arrow "2A" in FIG. 3.

Similarly, the extension element 24' is rotated about its axis 26', and while rotating, the extension element 24' is moved to engage the intermediate element 34', and then is urged against the intermediate element 34'. The extension element 24' is moved, and subsequently urged, in the direction indicated by arrow "2B" in FIG. 3.

As described above, shortly after the intermediate element 34' engages the stub element 28', the intermediate element 34' stops rotating, because the intermediate element 34' and the stub element 28' are bonded with each other. The intermediate element 34' may continue to be urged against the stub element 28' for a time period after the intermediate element's rotation has ceased. Similarly, shortly after the extension element 24' engages the intermediate element 34', the extension element 24' stops rotating, because the extension element 24' and the intermediate element 34' are bonded with each other. The extension element 24' may continue to be urged against the intermediate element 34' for a time period after the extension element's rotation has ceased.

The result is an assembly 22' in which the intermediate element 34' and the stub element 28' are bonded with each other, and in which the extension element 24' and the intermediate element 34' are bonded with each other also (FIG. 4).

It will be understood that a number of devices used in practising the method of the invention illustrated in FIGS. 3 and 4 have been omitted from the drawings, for clarity of illustration.

As noted above, the method of the invention may be utilized in connecting elements that are solid (i.e., not hollow). For example, in FIGS. 5 and 6, a stub element 28" that is not hollow and forms part of a larger piece or subassembly 58" is shown that is connected, via an intermediate element 34", with an extension element 24". The subassembly 58" may be stationary.

Figure 5:
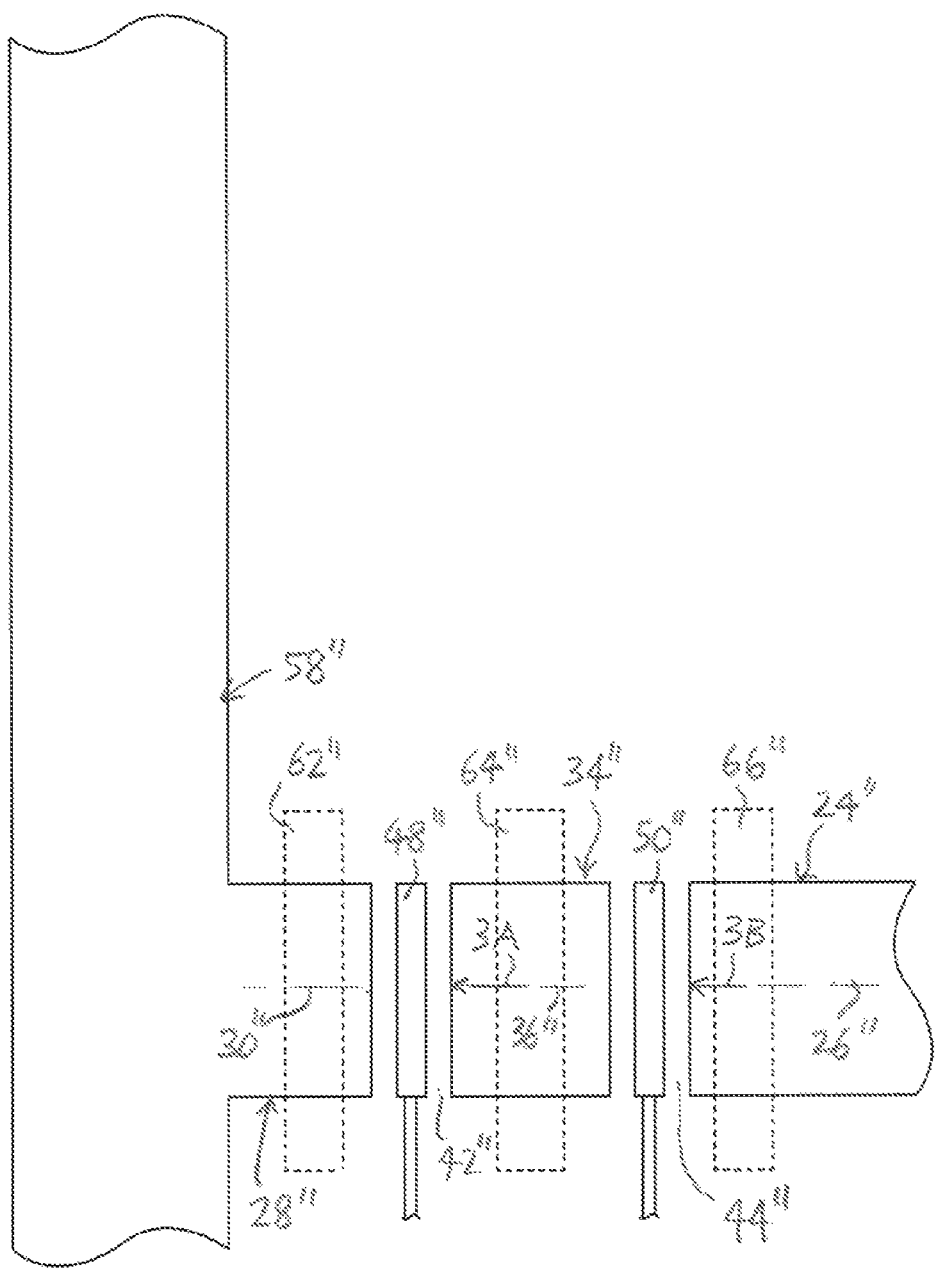
FIG. 5 is a top view of an alternative embodiment of the intermediate element of the invention positioned between the stub element and the extension element to define respective first and second gaps therebetween, in which first and second heating elements are respectively receivable.
Figure 6:
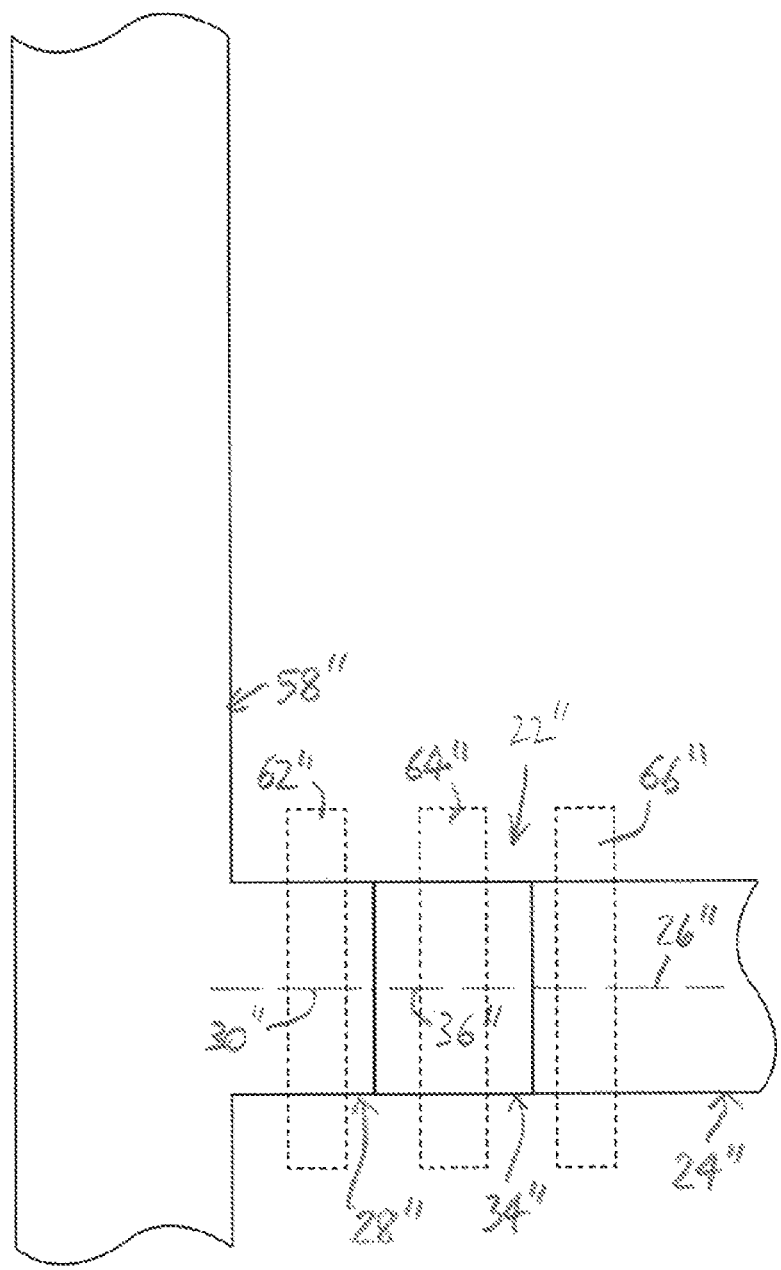
FIG. 6 is a top view of an alternative embodiment of the assembly of the invention in which the stub element is connected with the extension element by the intermediate element.

As can be seen in FIGS. 5 and 6, clamps 62", 64", and 66" preferably are secured to the stub element 28", the intermediate element 34" and the extension element 24" respectively.

In FIG. 5, the intermediate element 34" is positioned to define a first gap 42" between it and the stub element 28", and the extension element 24" is positioned to define a second gap 44" between it and the intermediate element 34". The intermediate element axis 36" is aligned with the stub element axis 30", and the extension element axis 26" is aligned with the intermediate element axis 36". The first heating element 48" and the second heating element 50" preferably are located in the first and second gaps 42", 44" respectively.

It will be understood that, in the same way as described above in connection with FIGS. 1A-2, hot portions (not shown) of each of the stub element 28", the intermediate element 34", and the extension element 24" preferably are heated to the hot working temperature in a non-oxidizing atmosphere by the heating elements 48", 50". The heating elements 48", 50", are then removed from the gaps 42", 44", and while the intermediate element 34" rotates about its axis 36", the intermediate element 34" is translocated to engage the stub element 28", and while rotating, is urged against the stub element 28". The intermediate element 34" is moved, and subsequently urged, in the direction indicated by arrow "3A" in FIG. 5.

Similarly, the extension element 24" is rotated about its axis 26", and while rotating, the extension element 24" is moved or translocated to engage the intermediate element 34", and the extension element 24" is then is urged against the intermediate element 34", while the extension element 24" is rotating. The extension element 24" is moved, and subsequently urged, in the direction indicated by arrow "3B" in FIG. 5.

As described above, shortly after the intermediate element 34" engages the stub element 28", the intermediate element 34" stops rotating, because the intermediate element 34" and the stub element 28" are bonded with each other. The intermediate element 34" may continue to be urged against the stub element 28" for a time period after the intermediate element's rotation has ceased. Similarly, shortly after the extension element 24" engages the intermediate element 34", the extension element 24" stops rotating, because the extension element 24" and the intermediate element 34" are bonded with each other. The extension element 24" may continue to be urged against the intermediate element 34" for a time period after the extension element's rotation has ceased.

The result is an assembly 22" in which the intermediate element 34" and the stub element 28" are bonded with each other, and in which the extension element 24" and the intermediate element 34" are bonded with each other also (FIG. 6).

It will be understood that a number of devices used in practising the method of the invention illustrated in FIGS. 5 and 6 have been omitted from the drawings, for clarity of illustration.

Figure 7B:
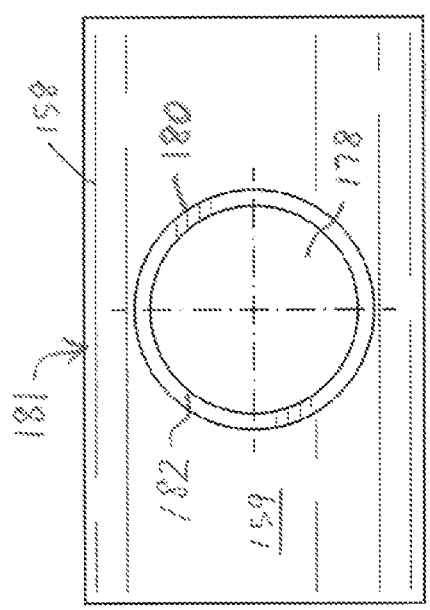
FIG. 7B is a side view of the tubular body of FIG. 7A, drawn at a larger scale.

As can be seen in FIGS. 7A-7C, in one embodiment, the method of the invention is utilized to form an assembly 122 in which a metal extension element 124 partially defined by an extension element axis 126 is connected with a tubular body 158 having one or more apertures 178 therein. The aperture 178 is defined by a central axis 130 thereof, and a ring element 180 is secured to the tubular body 158 and has a ring element exposed end 182 defining a ring plane 184. The ring element 180 and the tubular body 158 form a tubular body subassembly 181. As can be seen in FIG. 7A, the ring plane 184 preferably is orthogonal to the central axis 130. The tubular body 158 is circular in cross-section, so that a side 159 of the tubular body 158 is curved (FIG. 7B). The ring element 180 is mounted to the side 159 around the aperture 178, to provide the ring element exposed end 182, which provides a planar surface around the aperture 178, defining the ring plane 184.

In one embodiment, the method preferably includes providing an intermediate element 134 that is metallically bondable with each of the ring element 180 and the extension element 124 respectively. Preferably, the intermediate element 134 is partially defined by an intermediate element axis 136. The intermediate element 134 extends between first and second ends 138, 140 thereof, each of the first and second ends 138, 140 respectively defining first and second planes 186, 188.

It is preferred that the intermediate element 134 is positioned relative to the ring element 180 to define a first gap 142 between the first end 138 of the intermediate element 134 and the ring element exposed end 182, to locate the first plane 186 and the ring plane 184 parallel to each other, and to align the intermediate element axis 136 with the central axis 130.

Preferably, the extension element 124 is positioned relative to the intermediate element 134 to define a second gap 144 between an inner end 146 of the extension element 124 and the second end 140 of the intermediate element 134. The inner end 146 defines an extension element inner end plane 190. The extension element 124 is positioned to locate the extension element inner end plane 146 and the second plane 188 parallel to each other, and to align the extension element axis 126 with the intermediate element axis 136.

It is also preferred that one or more first heating elements 148, and one or more second heating elements 150, are provided. Preferably, the first and second heating elements 148, 150 are located in the first and second gaps 142, 144 respectively. A non-oxidizing atmosphere is also preferably provided, in defined volumes around each of the first and second gap respectively.

The first heating element 148 preferably is energized to heat the ring element exposed end 182 and the first end 138 of the intermediate element 134 to a hot working temperature in the non-oxidizing atmosphere. Also, the second heating element 150 preferably is energized to heat the second end 140 of the intermediate element 134 and the extension element inner end 146 to the hot working temperature in the non-oxidizing atmosphere. Such heating provides respective hot portions 152, 154, of each of the tubular body subassembly 181, the intermediate element 134 at its first end 138, and respective hot portions 155, 156 of each of the intermediate element 134 at its second end 140, and the extension element 124. The hot portion 152 extends a first predetermined distance 168 from the ring element exposed end 182 into the tubular body subassembly 181. The second hot portion 154 extends a first predetermined intermediate element distance 170 from the first end 138 into the intermediate element 134. The third hot portion 155 extends a second predetermined intermediate element distance 172 from the second end 140 into the intermediate element 134. The fourth hot portion 156 extends a second predetermined distance 174 from the extension element inner end 146 into the extension element 124. After heating thereof by the first and second heating elements 148, 150 respectively, each of the hot portions 152, 154, 155, 156 preferably is at the hot working temperature.

Next, the first and second heating elements 148, 150 preferably are removed from the first and second gaps 142, 144. The intermediate element 134 is rotated about the intermediate element axis 136.

While the respective hot portions 154, 152 of the intermediate element 134 and the tubular body subassembly 181 are at the hot working temperature, and while the intermediate element 134 rotates about the intermediate element axis 136, the first end 138 of the intermediate element 134 is urged against the ring element exposed end 182, for plastic deformation of the intermediate element 134 at the first end 138, and for plastic deformation of the ring element 180 at the ring element exposed end 182, to bond the intermediate element 134 and the tubular body subassembly 181 with each other. The intermediate element 134 is moved toward the ring element 180 in the direction indicated in FIG. 7A by arrow "4A". When the first end 138 of the intermediate element 134 engages the ring element 180, the intermediate element 134 continues to be urged against the ring element 180 in the direction indicated by arrow "4A".

It is also preferred that the extension element 124 is rotated about the extension element axis 126.

While the respective hot portions 155, 156 of the intermediate element 134 and the extension element 124 are at the hot working temperature, and while the extension element 124 rotates about the extension element axis 126, the extension element inner end 146 is urged against the second end 140 of the intermediate element, for plastic deformation of the intermediate element 134 at its second end 140, and for plastic deformation of the extension element 124 at the extension element inner end 146, to bond the intermediate element 134 and the extension element 124 with each other. The extension element 124 is moved toward the second end 140 of the intermediate element 134 in the direction indicated in FIG. 7A by arrow "4B". When the inner end 146 of the extension element 124 engages the second end 140, the extension element 124 continues to be urged against the second end 140 of the intermediate element 134 in the direction indicated by arrow "4B".

From the foregoing, it can be seen that the assembly 122 is formed that includes the tubular body 158 that is connected with the extension element 124 by the intermediate element 134.

Where the tubular body 158 is made of a first metal, the extension element 124 is made of a second metal, and the intermediate element 134 is made of a third metal that is metallically bondable with each of the first metal and the second metal, the method of the invention can be used to connect the tubular body 158 with the extension element 124, i.e., via the intermediate element 134.

It will be understood that a number of devices used in practising the method of the invention illustrated in FIGS. 7A-7C have been omitted from the drawings, for clarity of illustration.

Figure 8B:
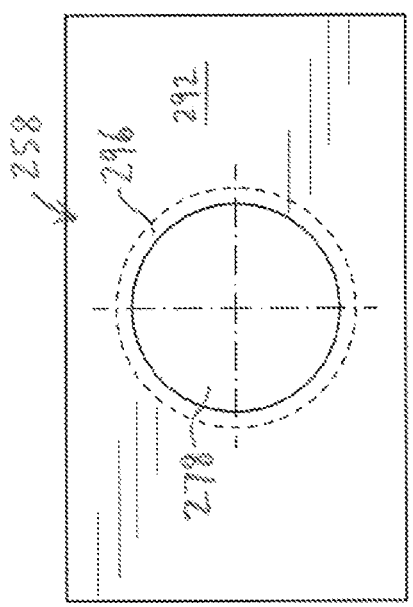
FIG. 8B is a side view of the body of FIG. 8A, drawn at a larger scale.

As can be seen in FIGS. 8A-8C, in one embodiment, the method of the invention is utilized to form an assembly 222 (FIG. 8C) in which an extension element 224 partially defined by an extension element axis 226 thereof is connected with a body 258 having a flat surface 292 defining a surface plane 294 with one or more apertures 278 therein. The aperture 278 preferably is partially defined by a central axis 230 thereof and an aperture perimeter region 296 on the flat surface 292.

Preferably, the method includes providing an intermediate element metallically bondable with each of the body 258 and the extension element 224 respectively. The intermediate element 234 preferably is partially defined by an intermediate element axis 236. It is also preferred that the intermediate element 234 extends between first and second ends 238, 240 thereof, each of the first and second ends 238, 240 respectively defining first and second planes 286, 288.

The intermediate element 234 preferably is positioned relative to the aperture perimeter region 296 to define a first gap 242 between the first end 238 of the intermediate element 234 and the aperture perimeter region 296, to locate the first plane 286 and the surface plane 294 parallel to each other and to align the intermediate element axis 236 with the central axis 230.

It is also preferred that the extension element 224 is positioned relative to the intermediate element 234 to define a second gap 244 between an inner end 246 of the extension element 224 and the second end 240 of the intermediate element. The inner end 246 preferably defines an extension element inner end plane 290. The extension element 224 is also positioned to locate the extension element inner end plane 290 parallel with the second plane 288, and to align the extension element axis 226 with the intermediate element axis 236.

One or more first and second heating elements 248, 250 preferably are provided. The first and second heating elements 248, 250 are located in the first and second gaps 242, 244 respectively. A non-oxidizing atmosphere is provided in defined volumes around each of the first and second gaps 242 respectively.

The first heating element 248 preferably is energized to heat the aperture perimeter region 296 and the first end 238 of the intermediate element 234 to a hot working temperature in the non-oxidizing atmosphere. Also, the second heating element 250 preferably is energized to heat the second end 240 of the intermediate element 234 and the inner end 246 of the extension element 224 to the hot working temperature, also in the non-oxidizing atmosphere. Such heating provides respective hot portions 252, 254 of each of the body 258, the intermediate element 234 at its first end 238, and respective hot portions 255, 256 of each of the intermediate element 234 at its second end 240, and the extension element 224.

The first hot portion 252 extends a first predetermined distance 268 into the body 258. The second hot portion 254 extends a first intermediate element predetermined distance 270 from the first end 238 into the intermediate element 234. The third hot portion 255 extends a second intermediate element predetermined distance 272 from the second end 240 into the intermediate element 234. The fourth hot portion 256 extends a second predetermined distance 274 from the inner end 246 into the extension element 224. After heating thereof by the first and second heating elements 248, 250 respectively, each of the hot portions 252, 254, 255, 256 preferably is at the hot working temperature.

Next, the first and second heating elements 248, 250 preferably are removed from the first and second gaps 242, 244. The intermediate element 234 is rotated about the intermediate element axis 236.

While the respective hot portions 254, 252 of the intermediate element 234 and the body 258 are at the hot working temperature, and while the intermediate element 234 rotates about the intermediate element axis 236, the first end 238 of the intermediate element 234 is urged against the aperture perimeter region 296, for plastic deformation of the intermediate element 234 at the first end 238, and for plastic deformation of the body 258 at the aperture perimeter region 296, to bond the intermediate element 234 and the body 258 with each other. The intermediate element 234 is moved toward the aperture perimeter region 296 in the direction indicated in FIG. 8A by arrow "5A". When the first end 238 of the intermediate element 234 engages the aperture perimeter region 296, the intermediate element 234 continues to be urged against the aperture perimeter region 296 in the direction indicated by arrow "5A".

It is also preferred that the extension element 224 is rotated about the extension element axis 226.

While the respective hot portions 255, 256 of the intermediate element 234 and the extension element 224 are at the hot working temperature, and while the extension element 224 rotates about the extension element axis 226, the extension element inner end 246 is urged against the second end 240 of the intermediate element 234, for plastic deformation of the intermediate element 234 at the second end 240, and for plastic deformation of the extension element 224 at the inner end 246, to bond the intermediate element 234 and the extension element 224 with each other. The extension element 224 is moved toward the second end 240 of the intermediate element 234 in the direction indicated in FIG. 8A by arrow "5B". When the inner end 246 of the extension element 224 engages the second end 240, the extension element 224 continues to be urged against the second end 240 of the intermediate element 234 in the direction indicated by arrow "5B".

Where the body 258 is made of a first metal, the extension tube 224 is made of a second metal, and the intermediate tube 234 is made of a third metal that is metallically bondable with each of the first metal and the second metal, the method can be used to connect the extension tube 224 and the body 258, via the intermediate tube 234.

It will be understood that a number of devices used in practising the method of the invention illustrated in FIGS. 8A-8C have been omitted from the drawings, for clarity of illustration.

In one embodiment, the method of the invention may be utilized where the tubes or pipes to be joined have different outer diameters and/or different inner diameters. Inner edges of the tubes or pipes to be joined may be beveled to reduce turbulent flow and eddies. The force used to urge the tubes or pipes together preferably should take any reduced thickness of the end of the tube or pipe that engages and is urged against another body into account. Because the force required in order to join the tubes or pipes together is proportional to the surface area of a tube or pipe that is engaged, where less area is engaged because a tube or pipe is thinner, somewhat less force is to be used to join that tube or pipe to another. Alternatively, a tube or pipe with a thicker wall would require somewhat more force to be used to urge it against the other tube or pipe, to achieve the bonding required. Also, the hot working temperature may be adjusted, depending on the thickness of the pipe or tube wall, and depending on the metals.

Figure 9B:
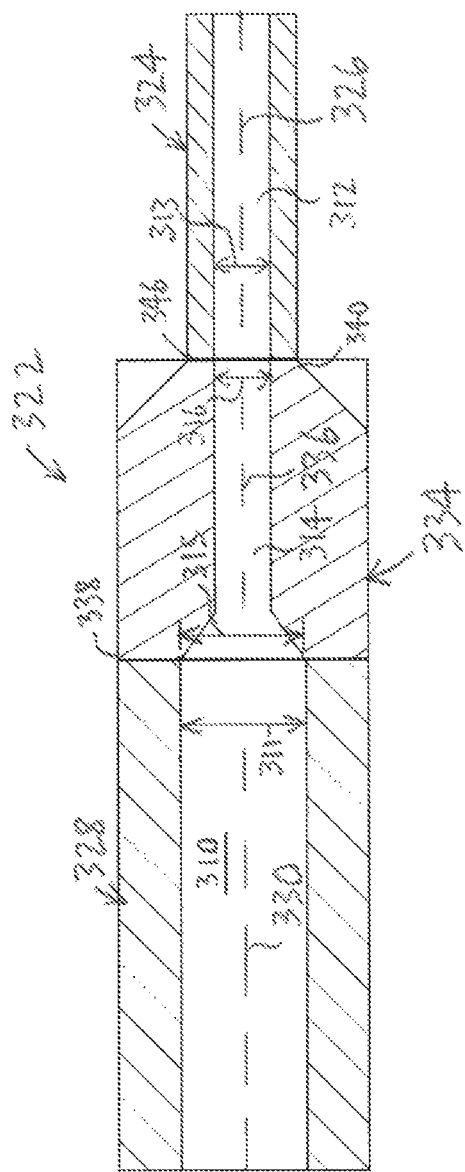
FIG. 9B is a longitudinal cross-section of an alternative embodiment of the assembly of the invention in which the first tube is connected with the extension tube by the intermediate tube.

In one embodiment, the invention provides a method of forming an assembly 322 in which an extension tube 324 partially defined by an extension tube axis 326 thereof and having an extension tube outer diameter 302 is connected with a first tube 328 partially defined by a first tube axis 330 (FIG. 9B). The first tube 328 has a first tube outer diameter 304 at a first tube open end 332 thereof. The method preferably includes providing an intermediate tube 334 that is metallically bondable with each of the first tube 328 and the extension tube 324 respectively. The intermediate tube 334 is partially defined by an intermediate tube axis 336, and the intermediate tube 334 extends between first and second open ends 338, 340 thereof. As can be seen in FIG. 9A, the intermediate tube 334 preferably has a first outer diameter 306 at the first open end 338 thereof that is equal (or approximately equal) to the first tube outer diameter 302.

Preferably, and as illustrated in FIG. 9A, the intermediate tube 334 is positioned relative to the first tube 328 to define a first gap 342 between the first open end 338 of the intermediate tube 334 and the first tube open end 332, and to align the intermediate tube axis 336 with the first tube axis 330.

It is also preferred that the extension tube 324 is positioned relative to the intermediate tube 334 to define a second gap 344 between an inner end 346 of the extension tube 324 and the second open end 340 of the intermediate tube 334, and to align the extension tube axis 326 with the intermediate tube axis 336. Preferably, the intermediate tube 334 has a second outer diameter 308 at the second open end 340 that is equal (or approximately equal to the extension tube outer diameter 302.

One or more first heating elements 348 and one or more second heating elements 350 are provided. The first heating element 348 is located in the first gap 342, and the second heating element 350 is located in the second gap 344. Preferably, a non-oxidizing atmosphere is provided in defined volumes around each of the first gap 342 and the second gap 344 respectively.

The first heating element 348 is energized to heat the first tube open end 332 and the first open end 338 of the intermediate tube 334 to a first hot working temperature in the non-oxidizing atmosphere. Also, the second heating element 350 to heat the second open end 340 of the intermediate tube 334 and the extension tube inner end 346 to a second hot working temperature in the non-oxidizing atmosphere. The heat provided by the first heating element 348 provides first and second hot portions 352, 354 of the first tube 328 and the intermediate tube 334 at the first open end 338 thereof respectively. The heat provided by the second heating element 350 provides third and fourth hot portions 355, 356 of the intermediate tube 334 at the second open end 340 and the extension tube 324 respectively. As will be described, the first and second hot portions 352, 354 are at the first hot working temperature, and the third and fourth hot portions 355, 356 are at the second hot working temperature.

Next, the first and second heating elements 348, 350 preferably are removed from the first and second gaps 342, 344.

It is preferred that the intermediate tube 334 is rotated about the intermediate tube axis 336. While the first hot portion 352 and the second hot portion 354 are at the first hot working temperature, and while the intermediate tube 334 rotates about the intermediate tube axis 336, the first open end 338 of the intermediate tube 334 is urged against the first tube open end 332, to bond the intermediate tube 334 and the first tube 328 with each other. The intermediate element 334 is moved toward the first tube open end 332 in the direction indicated in FIG. 9A by arrow "6A". When the first end 338 of the intermediate element 334 engages the first tube open end 332, the intermediate element 334 continues to be urged against the first tube open end 332 in the direction indicated by arrow "6A".

Preferably, the extension tube 324 is also rotated about the extension tube axis 326. While the third hot portion 355 and the fourth hot portion 356 are at the second hot working temperature, and while the extension tube 324 is rotated about the extension tube axis 326, the inner end 346 of the extension tube 326 is urged against the second open end 340 of the intermediate tube 334, to bond the extension tube 324 and the intermediate tube with each other. The extension element 324 is moved toward the second open end 340 of the intermediate element 334 in the direction indicated in FIG. 9A by arrow "6B". When the inner end 346 of the extension element 324 engages the second open end 340, the extension element 324 continues to be urged against the second open end 340 of the intermediate element 334 in the direction indicated by arrow "6B".

Where the first tube 328 is made of a first metal, the extension tube 324 is made of a second metal, and the intermediate tube 334 is made of a third metal that is metallically bondable with each of the first metal and the second metal, the first tube 328 and the extension tube 324 preferably are connected, via the intermediate tube 334, as described above.

The method of the invention may also be utilized where the tubes or pipes that are to be connected (i.e., via an intermediate tube) have different inner diameters. As can be seen in FIG. 9A, the first tube 328 includes a first tube channel 310 therein defined by a first tube inner diameter 311, and the extension tube 324 includes an extension tube channel 312 therein defined by an extension tube inner diameter 313. The intermediate tube 334 includes an intermediate tube channel 314 therein extending between the first and second open ends 338, 340. As illustrated, in this example, the intermediate tube channel 314 preferably has a first inner diameter 315 at the first open end 338 that is equal to (or approximately equal to) the first tube inner diameter 311 (FIG. 9B). Also, the intermediate tube channel 314 preferably has a second inner diameter 316 at the second open end 340 that is equal to (or approximately equal to) the extension tube inner diameter 313.

It will be understood that a number of devices used in practising the method of the invention illustrated in FIGS. 9A-9B have been omitted from the drawings, for clarity of illustration.

As noted above, the method of the invention may be utilized to form an assembly 422 that includes solid (i.e., non-hollow) elements. In the assembly 422, illustrated in FIG. 10B, a first element 428 is connected with an extension element 424, via an intermediate element 434. The method of this embodiment, illustrated in FIGS. 10A and 10B, is generally similar to the embodiments described above.

Figure 10A:
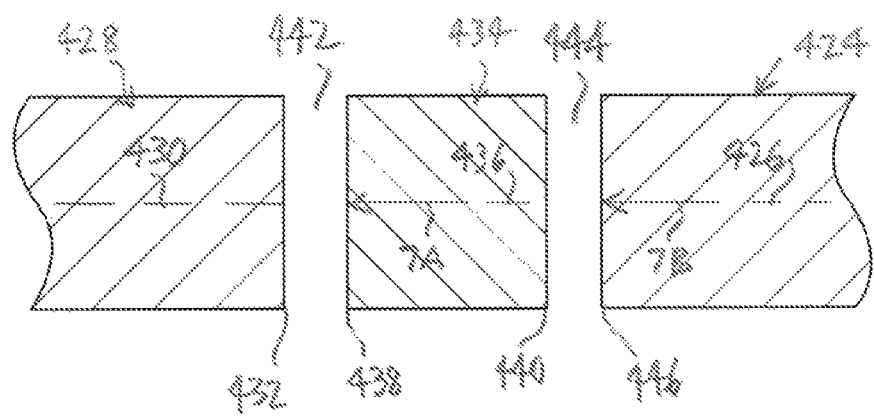
FIG. 10A is a longitudinal cross-section of embodiments of a solid intermediate element, a solid first element, and a solid extension element, positioned to define first and second gaps in which first and second heating elements are receivable.
Figure 10B:
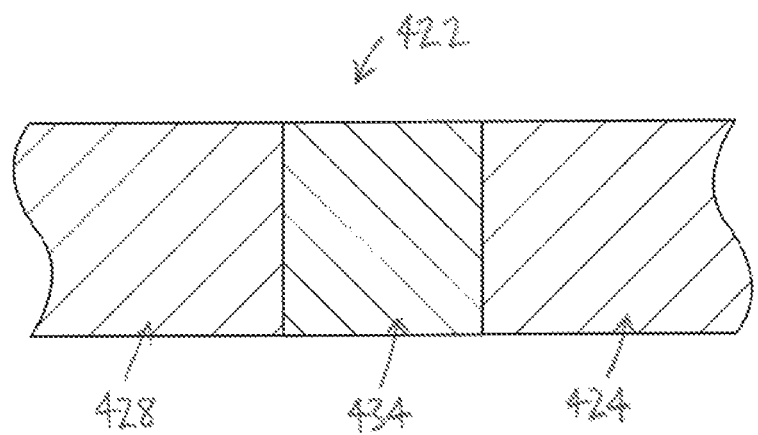
FIG. 10B is a longitudinal cross-section of another alternative embodiment of the assembly of the invention in which the first element is connected with the extension element by the intermediate element.

As can be seen in FIG. 10A, a first end 438 of the intermediate element 434 is positioned relative to the first element 428 so that the respective axes 436, 430 of the intermediate element 434 and the first element 428 are aligned. The first end 438 is spaced apart from an exposed end 432 of the first element 428 to define a first gap 442 between the first end 438 and the exposed end 432. Similarly, the extension element 424 is positioned relative to a second end 440 of the intermediate element 434 to align the extension element axis 426 with the intermediate element axis 436. An inner end 446 of the extension element 424 is spaced apart from a second end 440 of the intermediate element 434, to define a second gap 444 between the extension element 424 and the second end 440 of the intermediate element 434.

It will be understood that the exposed end 432 and the first end 438 are heated to a hot working temperature in a non-oxidizing atmosphere by one or more first heating elements (not shown) that are located in the first gap 442. Similarly, the second end 440 and the inner end 446 are heated to the hot working temperature in the non-oxidizing atmosphere by one or more second heating elements (not shown) that are located in the second gap 444.

Once the heating is completed, the heating elements are removed, as described above in connection with other embodiments of the invention. While the intermediate element 434 is rotating about the intermediate element axis 436, the first end 438 is engaged with the exposed end 432 of the first element 428, and when first engaged, the intermediate element 434 continues to rotate, and it also continues to be urged against the exposed end 432 of the first element 428, for plastic deformation of the engaged elements. The first end 438 and the exposed end 432 become bonded to each other as a result. The rotation of the intermediate element 434 ends shortly after engagement. The direction in which the intermediate element 434 is translocated to engage the first end 438 with the exposed end 432, and the direction in which the intermediate element 434 is urged after engagement with the first element 428, is indicated in FIG. 10A by arrow "7A".

Subsequently, the inner end 446 of the extension element 424 is engaged with the second end 440 of the intermediate element 434. While the extension element 424 is rotating about the extension element axis 426, the inner end 446 is engaged with the second end 440 of the extension element 424. When they are first engaged, the extension element 424 continues to rotate, and the extension element 424 also simultaneously continues to be urged against the second end 440 of the intermediate element 434, for plastic deformation of the engaged elements. The inner end 446 and the second end 442 become bonded to each other as a result. The rotation of the extension element 424 ends shortly after engagement. The direction in which the extension element 424 is translocated to engage the inner end 446 with the second end 440, and the direction in which the extension element 424 is urged after engagement with the intermediate element 434, is indicated in FIG. 10A by arrow "7B".

It will be understood that a number of devices used in practising the method of the invention illustrated in FIGS. 10A and 10B have been omitted from the drawings, for clarity of illustration.

It will also be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of forming an assembly in which a metal extension element partially defined by an extension element axis thereof is connected with a tubular body having at least one aperture therein, said at least one aperture being partially defined by a central axis thereof and a ring element secured to the tubular body and having a ring element exposed end defining a ring plane, the ring element and the tubular body forming a tubular body subassembly, the method comprising the steps of:
   (a) providing an intermediate element metallically bondable with each of the ring element and the extension element respectively, the intermediate element being partially defined by an intermediate element axis, the intermediate element extending between first and second ends thereof, each of the first and second ends respectively defining first and second planes;
   (b) positioning the intermediate element relative to the ring element to define a first gap between the first end of the intermediate element and the ring element exposed end, to locate the first plane and the ring plane parallel to each other and to align the intermediate element axis with the central axis;
   (c) positioning the extension element relative to the intermediate element to define a second gap between an inner end of the extension element and the second end of the intermediate element, the inner end defining an extension element inner end plane, to locate the extension element inner end plane and the second end plane parallel to each other and to align the extension element axis with the intermediate element axis;
   (d) providing at least one first heating element and at least one second heating element;
   (e) locating said at least one first heating element and said at least one second heating element in the first and second gaps respectively;
   (f) providing a non-oxidizing atmosphere in defined volumes around each of the first gap and the second gap respectively;
   (g) energizing said at least one first heating element to heat the ring element exposed end and the first end of the intermediate element to a hot working temperature in the non-oxidizing atmosphere, and energizing said at least one second heating element to heat the second end of the intermediate element and the extension element inner end to the hot working temperature in the non-oxidizing atmosphere, to provide respective hot portions of each of the tubular body subassembly and the intermediate element at the first end, and hot portions of each of the intermediate element at the second end and the extension element, each said hot portion being at the hot working temperature;
   (h) removing said at least one first heating element and said at least one second heating element from the first and second gaps respectively;
   (i) rotating the intermediate element about the intermediate element axis;
   (j) while the respective hot portions of the intermediate element at the first end and the tubular body subassembly are at the hot working temperature, and while the intermediate element rotates about the intermediate element axis, urging the first end of the intermediate element against the ring element exposed end, for plastic deformation of the intermediate element at the first end, and for plastic deformation of the ring element at the ring element exposed end, to bond the intermediate element and the tubular body subassembly with each other;
   (k) rotating the extension element about the extension element axis; and
   (l) while the respective hot portions of the intermediate element at the second end and the extension element are at the hot working temperature, and while the extension element rotates about the extension element axis, urging the extension element inner end against the second end of the intermediate element, for plastic deformation of the intermediate element at its second end, and for plastic deformation of the extension element at the extension element inner end, to bond the intermediate element and the extension element with each other.

2. A method according to claim 1 in which the tubular body is made of a first metal, the extension element is made of a second metal, and the intermediate element is made of a third metal that is metallically bondable with each of the first metal and the second metal.

3. A method of forming an assembly in which an extension element partially defined by an extension element axis thereof is connected with a body having a flat surface defining a surface plane with at least one aperture therein, said at least one aperture being partially defined by a central axis thereof and an aperture perimeter region on the flat surface, the method comprising the steps of:
   (a) providing an intermediate element metallically bondable with each of the body and the extension element respectively, the intermediate element being partially defined by an intermediate element axis, the intermediate element extending between first and second ends thereof, each of the first and second ends respectively defining first and second planes;

(b) positioning the intermediate element relative to the aperture perimeter region to define a first gap between the first end of the intermediate element and the aperture perimeter region, to locate the first plane and the surface plane parallel to each other and to align the intermediate element axis with the central axis;

(c) positioning the extension element relative to the intermediate element to define a second gap between an inner end of the extension element and the second end of the intermediate element, the inner end defining an extension element inner end plane, to locate the extension element inner end plane and the second plane parallel to each other and to align the extension element axis with the intermediate element axis;

(d) providing at least one first heating element and at least one second heating element;

(e) locating said at least one first heating element and said at least one second heating element in the first and second gaps respectively;

(f) providing a non-oxidizing atmosphere in defined volumes around each of the first gap and the second gap respectively;

(g) energizing said at least one first heating element to heat the aperture perimeter region and the first end of the intermediate element to a hot working temperature in the non-oxidizing atmosphere, and energizing said at least one second heating element to heat the second end of the intermediate element and the extension element inner end to the hot working temperature in the non-oxidizing atmosphere, to provide respective hot portions of each of the body and the intermediate element at the first end thereof, and respective hot portions of each of the extension element and the intermediate element at the second end thereof, each said hot portion being at the hot working temperature;

(h) removing said at least one first heating element and said at least one second heating element from the first and second gaps respectively;

(i) rotating the intermediate element about the intermediate element axis;

(j) while the respective hot portions of the intermediate element at the first end thereof and the body are at the hot working temperature, and while the intermediate element rotates about the intermediate element axis, urging the first end of the intermediate element against the aperture perimeter region, for plastic deformation of the intermediate element at the first end, and for plastic deformation of the body at the aperture perimeter region, to bond the intermediate element and the body with each other;

(k) rotating the extension element about the extension element axis; and (l) while the respective hot portions of the intermediate element at the second end thereof and the extension element are at the hot working temperature, and while the extension element rotates about the extension element axis, urging the extension element inner end against the second end of the intermediate element, for plastic deformation of the intermediate element at its second end, and for plastic deformation of the extension element at the extension element inner end, to bond the intermediate element and the extension element with each other.

4. A method according to claim 3 in which the body is made of a first metal, the extension element is made of a second metal, and the intermediate element is made of a third metal that is metallically bondable with each of the first metal and the second metal.

5. A method of forming an assembly, the method comprising:

(a) providing a first tube partially defined by a first tube axis, the first tube having a first tube outer diameter at a first tube open end thereof, the first tube comprising a first tube channel therein defined by a first tube inner diameter;

(b) providing an extension tube partially defined by an extension tube axis, the extension tube having an extension tube outer diameter, the extension tube comprising an extension tube channel therein defined by an extension tube inner diameter;

(c) providing an intermediate tube metallically bondable with each of the first tube and the extension tube respectively, the intermediate tube being partially defined by an intermediate tube axis, the intermediate tube extending between first and second open ends thereof, the intermediate tube having a first outer diameter at the first open end thereof that is equal to the stationary tube outer diameter, the intermediate tube comprising an intermediate tube channel therein extending between the first and second open ends, the intermediate tube channel having a first inner diameter at the first open end that is equal to the first tube inner diameter, and the intermediate tube channel having a second inner diameter at the second open end that is equal to the extension tube inner diameter;

(d) positioning the intermediate tube relative to the first tube to define a first gap between the first open end of the intermediate tube and the first tube open end, and to align the intermediate tube axis with the stationary tube axis:

(e) positioning the extension tube relative to the intermediate tube to define a second gap between an inner end of the extension tube and the second open end of the intermediate tube, and to align the extension tube axis with the intermediate tube axis, the intermediate tube having a second outer diameter at the second open end that is equal to the extension tube outer diameter:

(f) providing at least one first heating element and at least one second heating element:

(g) locating said at least one first heating element and said at least one second heating element in the first and second gaps respectively;

(h) providing a non-oxidizing atmosphere in defined volumes around each of the first gap and the second gap respectively;

(i) energizing said at least one first heating element to heat the first tube open end and the first open end of the intermediate tube to a first hot working temperature in the non-oxidizing atmosphere, and energizing said at least one second heating element to heat the second open end of the intermediate tube and the extension tube inner end to a second hot working temperature in the non-oxidizing atmosphere, to provide respective first, second, third, and fourth hot portions of each of the first tube, the intermediate tube at the first open end thereof, the intermediate tube at the second open end thereof, and the extension tube respectively, said first and second hot portions being at the first hot working temperature, and said third and fourth hot portions being at the second hot working temperature;

(j) removing said at least one first heating element and said at least one second heating element from the first and second gaps respectively;
(k) rotating the intermediate tube about the intermediate tube axis;
(l) while the first hot portion and the second hot portion are at the first hot working temperature, and while the intermediate tube rotates about the intermediate tube axis, urging the first open end of the intermediate tube against the first tube open end, for bonding the intermediate tube and the first tube with each other;
(m) rotating the extension tube about the extension tube axis; and
(n) while the third hot portion and the fourth hot portion are at the second hot working temperature, and while the extension tube rotates about the extension tube axis, urging the extension tube inner end against the second open end of the intermediate tube, for bonding the extension tube and the intermediate tube with each other to form the assembly.

* * * * *